(12) United States Patent
Oosawa et al.

(10) Patent No.: US 7,220,516 B2
(45) Date of Patent: May 22, 2007

(54) BIPOLAR BATTERY WITH FLEXIBLE INSULATION FILM

(75) Inventors: Yasuhiko Oosawa, Yokosuka (JP); Ryouichi Senbokuya, Yokosuka (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 438 days.

(21) Appl. No.: 10/673,201

(22) Filed: Sep. 30, 2003

(65) Prior Publication Data

US 2004/0067417 A1 Apr. 8, 2004

(30) Foreign Application Priority Data

Oct. 8, 2002 (JP) .......................... P2002-294933

(51) Int. Cl.
*H01M 10/18* (2006.01)
*H01M 6/48* (2006.01)
*C25C 7/00* (2006.01)
*B60K 1/00* (2006.01)

(52) U.S. Cl. ................ 429/210; 429/246; 429/130; 204/254; 180/65.3

(58) Field of Classification Search ................ 429/210, 429/185, 130, 131, 136, 139, 233, 246; 204/254, 204/268; 180/65.3
See application file for complete search history.

(56) References Cited

U.S. PATENT DOCUMENTS 4,777,101 A 10/1988 Blomberg et al.
5,219,673 A 6/1993 Kaun
5,441,824 A * 8/1995 Rippel .......................... 429/53
5,916,709 A 6/1999 Arias et al.
2002/0160257 A1 10/2002 Lee et al.
2003/0054244 A1 * 3/2003 Fredriksson et al. ........ 429/210

FOREIGN PATENT DOCUMENTS

| CN | 1363121 | 8/2002 |
|---|---|---|
| JP | S47-33920 | 12/1972 |
| JP | 1-195673 A | 8/1989 |
| JP | 2-177268 A | 7/1990 |
| JP | 4-54148 | 5/1992 |
| JP | 8-7926 | 1/1996 |
| JP | 11-204136 | 7/1999 |
| JP | 11-238528 | 8/1999 |
| JP | 2000-188115 A | 7/2000 |
| JP | 2000-294288 A | 10/2000 |
| JP | 2003-249259 A | 9/2003 |

OTHER PUBLICATIONS

Michiyuki Kono, et al. "Network Polymer Electrolytes with Free Chain Ends as Internal Plasticizer." J. Electrochem. Soc., vol. 145, No. 5 May 1998. pp. 1521-1527.

* cited by examiner

*Primary Examiner*—Raymond Alejandro
(74) *Attorney, Agent, or Firm*—McDermott Will & Emery LLP

(57) ABSTRACT

A bipolar battery comprises a bipolar electrode having a positive electrode layer on one side of a collecting foil and a negative electrode layer on the other side of the collecting foil, and a polymer electrolyte layer disposed between the bipolar electrodes. In the bipolar battery, an insulation layer is provided on a periphery of at least one side of the collecting foil.

14 Claims, 8 Drawing Sheets

BIPOLAR BATTERY WITH FLEXIBLE INSULATION FILM

BACKGROUND OF THE INVENTION

1. Field of the Invention

The present invention relates to an insulation structure for insulating between electrodes and between cells of a bipolar battery using a polymer electrolyte.

2. Description of the Related Art

In recent years, lithium ion secondary batteries which can attain high energy and power densities have been developed as large capacity power sources of electric vehicles and the like. These lithium ion secondary batteries have a basic construction as follows. A positive electrode is made of an aluminum collector to which a positive electrode active material such as lithium cobaltate and a conductive material such as acetylene black are applied using a binder. A negative electrode is made of a copper collector to which carbon particles are applied using a binder. The positive and negative electrodes are placed together with a porous polyolefin film between them as a separator and are immersed in a non-aqueous electrolytic solution containing $LiPF_6$ or the like. When applying this kind of lithium ion secondary batteries to an electric vehicle or the like, batteries having the same construction are serially connected to construct a battery module unit. Further, an assembled battery is constructed by serially connecting these battery module units.

In view of energy and power densities of a battery, there have been demands for improved connections between cells and between modules in terms of connection resistance, space, and weight. Recently, a battery has been proposed in which a bipolar electrode unit is employed. In this bipolar electrode unit, the resistance of a connection between cells can be reduced, and therefore downsizing thereof is expected to be realized (refer to Japanese Patent Application Laid-Open No. H8-7926). In this proposal, a so-called cladding material is used, which is made by rolling two types of metal foils on a collector. Further, an electrolyte used in this proposal is liquid. Therefore, a hermetic seal is inevitable for each cell unit, and it is possible that liquid junction occurs between the cells.

Figure 1A:
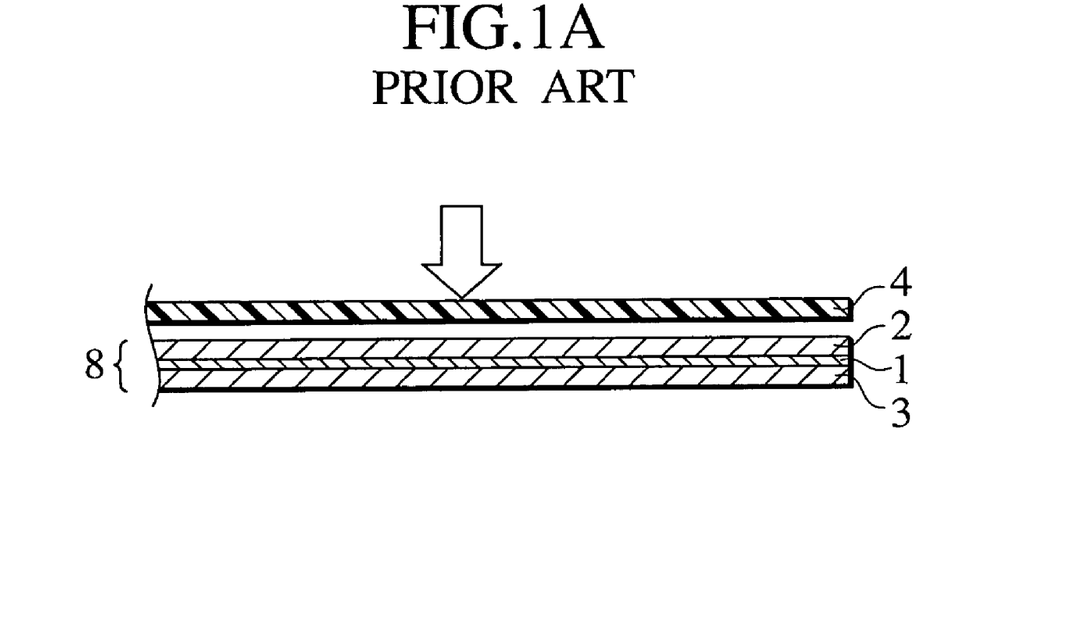
FIG. 1A is a cross-sectional view illustrating an edge of a bipolar electrode according to the conventional technology.
Figure 1B:
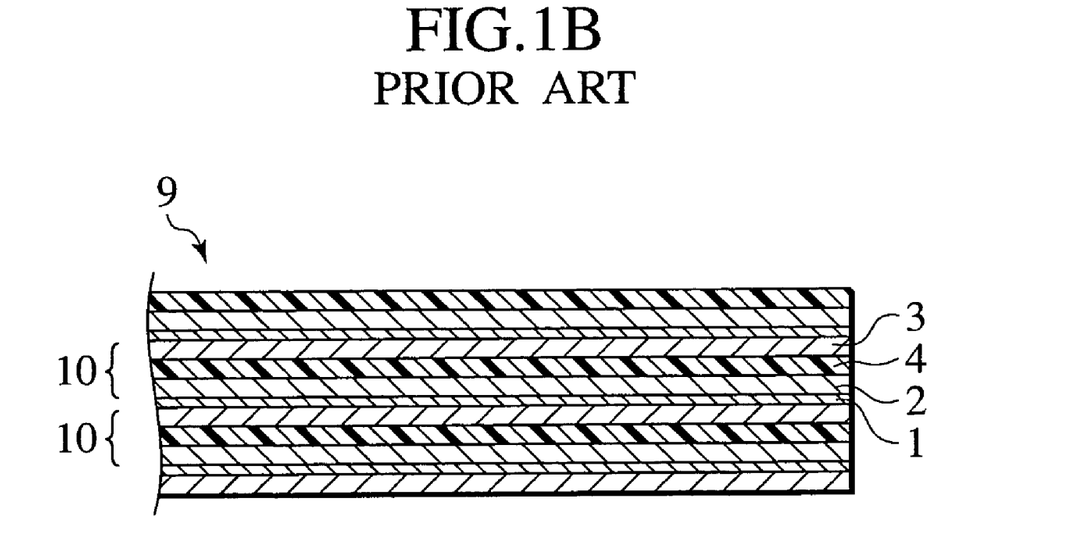
FIG. 1B is a cross-sectional view illustrating an edge of an electrode stacked body of a bipolar battery according to the conventional technology.

When a solid polymer electrolyte is used instead of the liquid electrolyte, the hermetic seal is not required, and thereby a practical bipolar battery can be constructed. A conventional example of a bipolar battery having a structure corresponding to this structure is shown in FIGS. 1A and 1B (refer to Unexamined Utility Model Application Publication No. H4-54148). This bipolar battery is made of an electrode stacked body 9 which is constructed by stacking a plurality of bipolar electrodes (electrode layers) 8 sandwiching a polymer electrolyte layer 4 therebetween. Each of the bipolar electrodes 8 includes a positive electrode layer 2 on one side of a collecting foil 1, and a negative electrode layer 3 on the other side of the same. The electrodes of the uppermost and lowermost layers do not have the bipolar electrode structure but have a structure in which only the necessary electrode layer is formed on one side of the collector (not shown). In the structure of the bipolar battery, single cells 10 are serially connected.

SUMMARY OF THE INVENTION

However, in the conventional bipolar battery, the bipolar electrodes 8 and polymer electrolyte layers 4 are stacked while at the same time ensuring the edges of same are well-aligned. Alternatively, the edge of the electrode stacked body 9 may be aligned by cutting the edge by some means. However, the uneven edges as well as burrs due to cutting can result in a short circuit. If the cut surface contacts with an object, the electrode layers 2 and 3 and the polymer electrolyte layers 4 partially crumble, thereby causing a sort of burr which also results in a short circuit.

The present invention was made in consideration of the above-described problems. It is an object of the present invention to provide a bipolar battery in which a short circuit is unlikely to occur because of the provision of an insulation structure that prevents a short circuit between electrodes and between single cells at each electrode edge.

The first aspect of the present invention provides a bipolar battery, comprising: a bipolar electrode having a positive electrode layer on one side of a collecting foil and a negative electrode layer on the other side of the collecting foil; and a polymer electrolyte layer disposed between the bipolar electrodes, wherein an insulation layer is provided on a periphery of at least one side of the collecting foil.

The second aspect of the present invention provides a vehicle, comprising: a power source having a bipolar battery, the bipolar battery, comprising: a bipolar electrode having a positive electrode layer on one side of a collecting foil and a negative electrode layer on the other side of the collecting foil; and a polymer electrolyte layer disposed between the bipolar electrodes, wherein an insulation layer is provided on a periphery of at least one side of the collecting foil.

BRIEF DESCRIPTION OF THE DRAWINGS

The invention will now be described with reference to the accompanying drawings wherein.

DETAILED DESCRIPTION OF THE PREFERRED EMBODIMENT

Hereinafter, description will be made of embodiments of the present invention with reference to the drawings.

Figure 8:
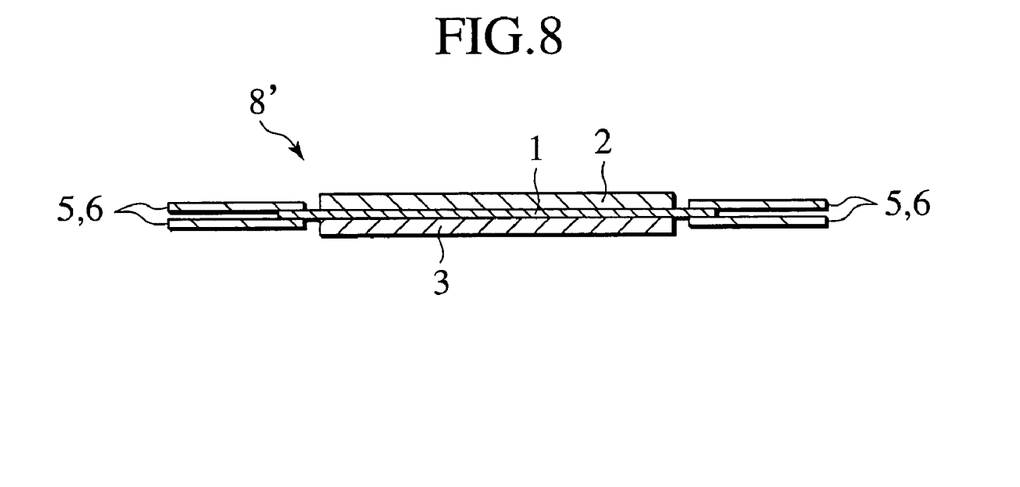
FIG. 8 is a schematic cross-sectional view illustrating a basic structure of the bipolar electrode of the bipolar battery according to the present invention.
Figure 9:
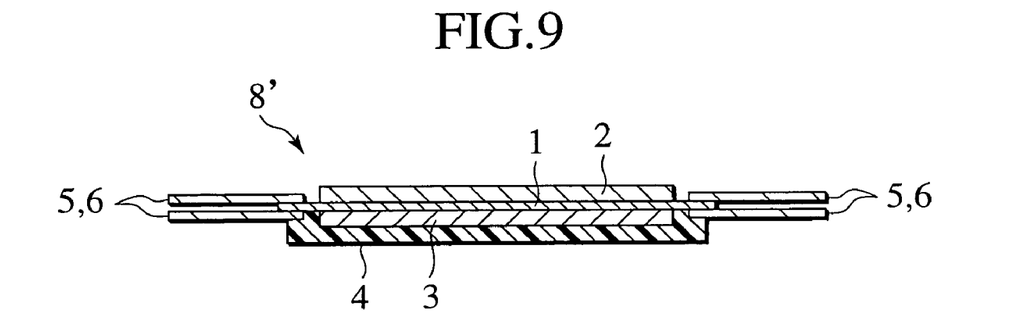
FIG. 9 is a schematic cross-sectional view illustrating a basic structure of the bipolar electrode, on which a polymer electrolyte layer is previously disposed, according to the present invention.
Figure 10:
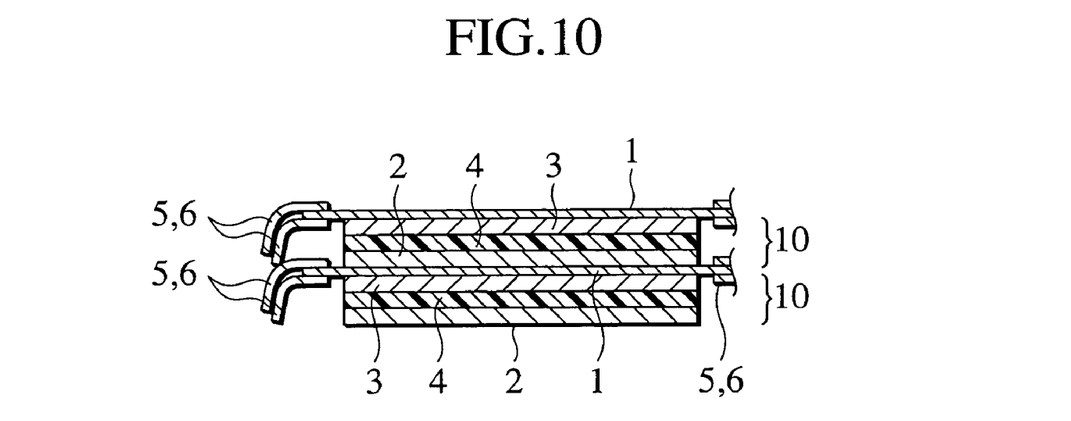
FIG. 10 is a schematic cross-sectional view illustrating a basic structure of a single cell layer of the bipolar battery according to the present invention.

The following are basic constructions of a bipolar battery, a bipolar electrode and a single cell layer of the present invention. As shown in FIGS. 8 to 10, a positive electrode layer 2 is provided on one side of a collecting foil 1, and a negative electrode layer 3 is provided on the other side of same, thus constructing a bipolar electrode 8. The bipolar electrodes 8 sandwich a polymer electrolyte layer (polymer electrolyte film) 4 between them. As a result, the electrode layers 2 and 3 (positive and negative electrode layers 2 and 3) face each other through the polymer electrolyte layer 4.

It is not necessary to sandwich the new polymer electrolyte layer between the electrode layers when a bipolar electrode 8' is used. This is in order that the bipolar electrode 8' already has the polymer electrolyte layer 4 formed on the surface of the positive electrode layer 2 and/or on the negative electrode layer 3. Therefore, improved adhesion between the layers and a simplified manufacturing process can be achieved (see FIG. 9).

Further, an insulation layer 5 (insulation film 5) is provided on the edge of each collector in the bipolar battery of the present invention. Therefore, the bipolar battery has a structure in which the collectors do not directly contact with one another.

Furthermore, the bipolar battery of the present invention is preferably constructed in the following manner: a battery packaging material 13 houses an electrode stacked body 9 in order to prevent an impact from outside or environmental deterioration while using the cell, and the peripheries of the packaging material 13 are partially or entirely joined by thermowelding, and thus the electrode stacked body 9 is sealed therein under reduced pressure. Leads 11 and 12 extend from the battery packaging material 13 (see FIGS. 11 and 12).

Figure 12:
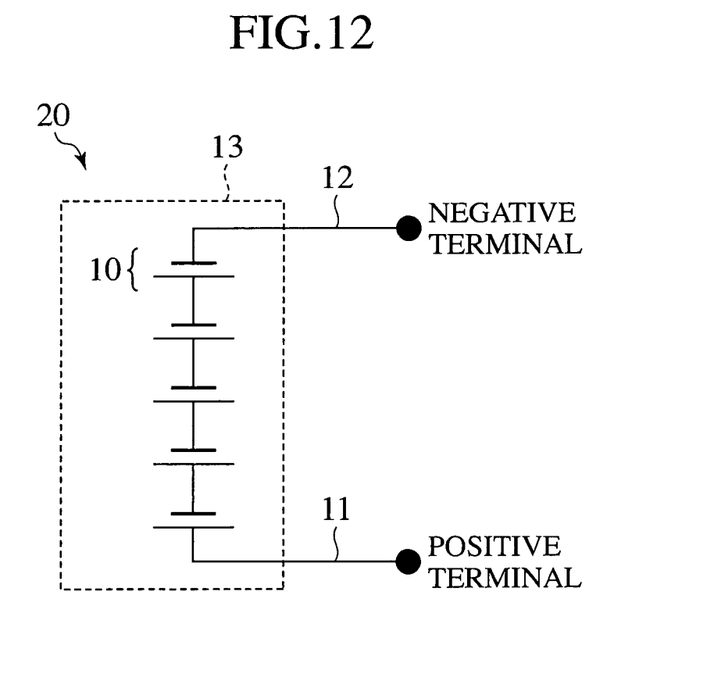
FIG. 12 is a schematic view illustrating a basic structure of the bipolar battery according to the present invention.

As shown in FIG. 12, the bipolar battery 20 has the basic construction where the single cells 10 are serially connected.

Hereinafter, the insulation layer will be described in detail.

In order to construct the bipolar battery in which the polymer electrolyte is used, a positive electrode layer 2 is formed on one side of the collecting foil 1 and the negative electrode layer 3 is formed on the opposite side of same, thus forming the bipolar electrode 8. The bipolar electrodes 8 are then stacked while sandwiching the polymer electrolyte layer 4 therebetween. One of the features of the present invention, which differs from the conventional example, is that the collecting foil is formed to have an exposed portion in its periphery, and the insulation film, that is, the insulation layer is disposed on the exposed potion. This is in order that a short circuit between electrodes and between electrolytes of respective cells can accordingly be prevented even more completely in the bipolar battery. Therefore, how the exposed portion is formed on the periphery of the collecting foil is important in the present invention. There are several approaches that can be taken to forming the exposed portion.

First of all, there is a method of forming an electrode layer, leaving the exposed portion on the periphery of the collecting foil uncoated. A second method is that the electrode layer is formed on the entire surface of the collecting foil, and the electrode layer on the periphery of the collecting foil is peeled away by some means. An example of the first method is pattern coating using a die coater or the like followed by crosslinking to solidify so that the electrode layer is formed, leaving the exposed portion uncoated. A similar electrode can be formed by the use of screen printing, etc. Further, spray coating using a mask as necessary can produce a similar electrode. An example of the second method is removing unnecessary portions of the electrode layer in the periphery using a cutter knife or the like. Another possible example is that unnecessary portions of the electrode layer are heated to induce flowability as well as stickiness of the polymer in the electrode, and unnecessary portions are removed by sticking to a plate or the like that can be heated and cooled.

Figure 2A:
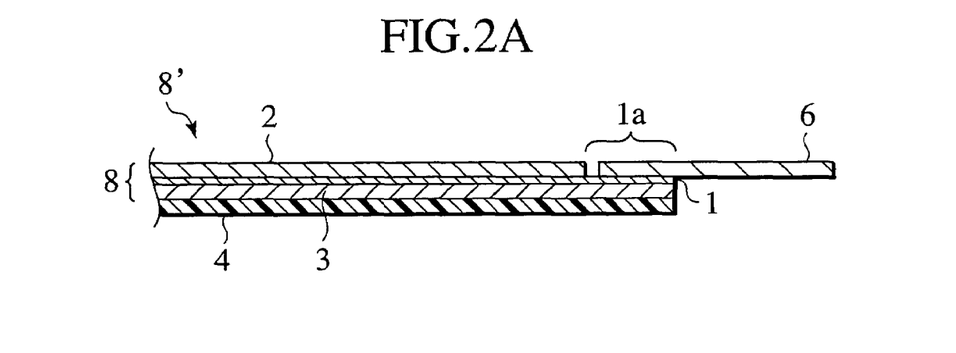
FIG. 2A is a cross-sectional view illustrating an edge of a bipolar electrode of the first embodiment according to the present invention.

With the foregoing methods, the bipolar electrode 8 in which the exposed portion 1a is formed on the periphery of the collecting foil 1 can be formed as shown in FIG. 2A. The bipolar electrode 8', in which the polymer electrolyte layer 4 is formed in advance, can be formed by disposing the insulation film 6 on at least a part of the exposed portion 1a and by further forming the polymer electrolyte layer 4 on the positive and/or negative electrode layers.

Figure 2B:
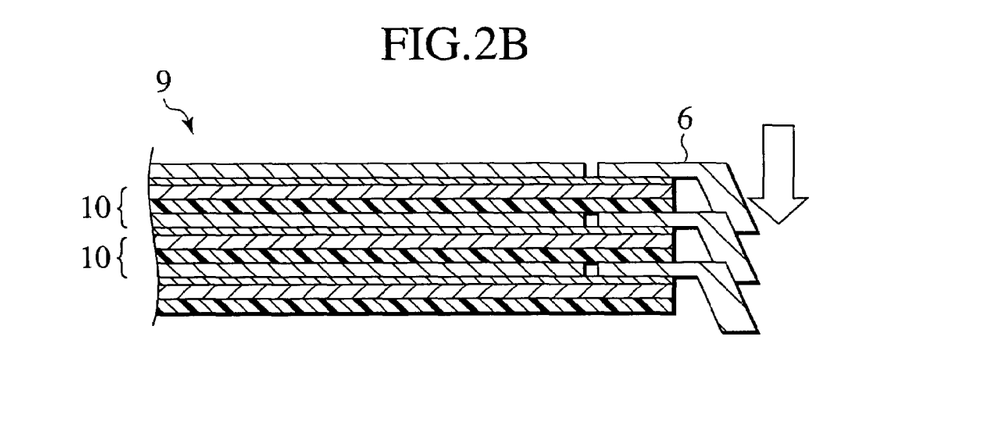
FIG. 2B is a cross-sectional view illustrating an edge of an electrode stacked body of a bipolar battery of the first embodiment according to the present invention.
Figure 2C:
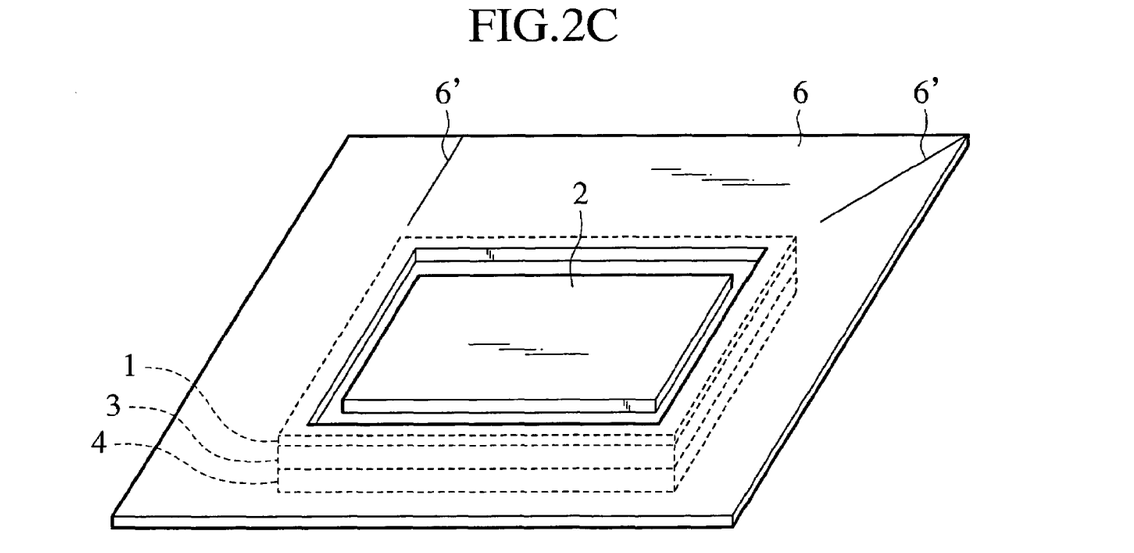
FIG. 2C is a perspective view illustrating the electrode stacked body of the bipolar battery of the first embodiment according to the present invention.

In the embodiment shown in FIGS. 2A to 2C, the bipolar electrode 8 is formed, where the exposed portion 1a is formed in the periphery on the side of the positive electrode layer 2 of the collecting foil 1. The insulation film 6 is disposed on a part of the exposed portion 1a. Further, the bipolar electrode 8', in which the polymer electrolyte layer 4 is formed in advance, is constructed by forming the polymer electrolyte layer 4 on the negative electrode layer 3. In this embodiment, as shown in FIG. 2C, the insulation film 6 as an insulating layer is disposed on the entire periphery, avoiding contact with the positive electrode layer 2. Additionally, the insulation film 6 is structured to protrude outward beyond the collecting foil 1 with a protruding length longer than the thickness of one single cell, and to be at least partially adhered to the exposed portion 1a on the periphery of the collecting foil 1. Moreover, the insulation film 6 is flexible and adhesive. Disposition of this insulation film 6 facilitates isolation of the electrodes within a single cell (single cell layer) and isolation of the electrolytes between the cells, which can thereby prevent a short circuit at the electrode edge. Furthermore, as shown in FIG. 2B, the neighboring insulation films 6 are adhered to each other, thereby enabling the side of the cells to be protected even more completely.

The bipolar battery of the present invention generally has a flat structure in which a plurality of rectangular bipolar electrodes 8' are stacked as shown in FIG. 2C. However, the structure of the bipolar battery is not particularly limited to this, and can be a cylindrical structure in which an insulation sheet is placed on an electrode stacked body and then coiled in a spiral shape, or can be a flat structure by further flattening the bipolar battery thus obtained. Here, the electrode stacked body is constituted by stacking the bipolar electrodes 8' that correspond to power generating elements of a lithium ion secondary battery cell with non-aqueous electrolyte.

Figure 3A:
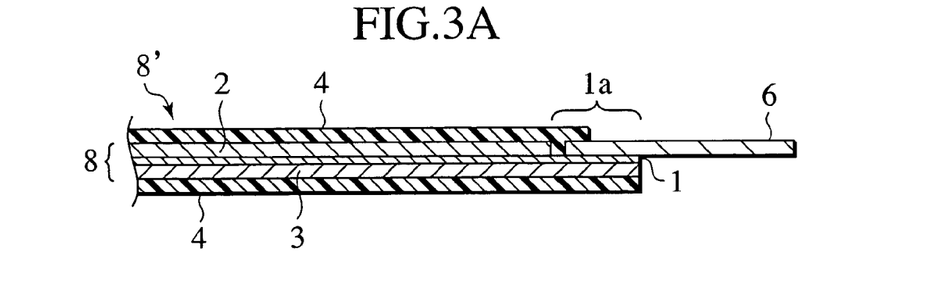
FIG. 3A is a cross-sectional view illustrating an edge of a bipolar electrode of the second embodiment according to the present invention.
Figure 3B:
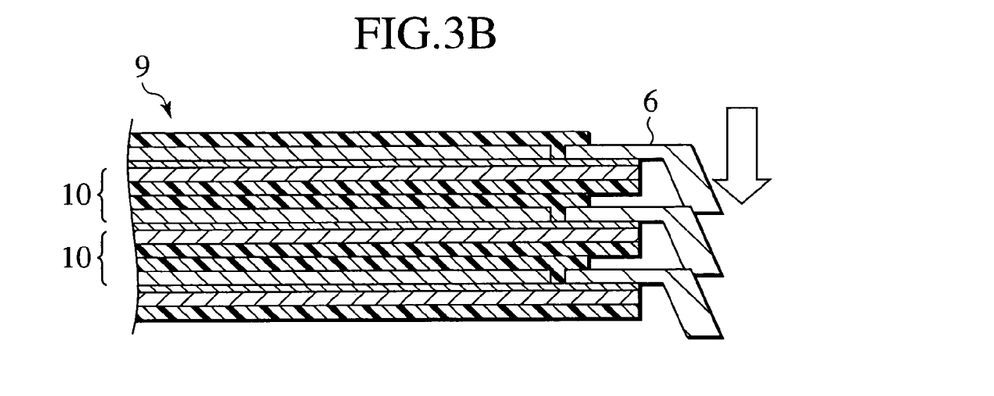
FIG. 3B is a cross-sectional view illustrating an edge of an electrode stacked body of a bipolar battery of the second embodiment according to the present invention.

As shown in FIGS. 3A and 3B, the second embodiment is constructed as follows. The bipolar electrode 8 is formed, in which the exposed portion 1a is formed in the periphery on the side of the positive electrode layer 2 of the collecting foil 1, and the insulation film 6 is disposed on a part of the exposed portion 1a. The insulation film 6 is disposed on the entire periphery, avoiding contact with the positive electrode layer 2. Further, the polymer electrolyte layers 4 are respectively formed on both positive and negative electrode layers 2 and 3, thus constituting the bipolar electrode 8' in which the polymer electrolyte layer 4 is formed in advance. The polymer electrolyte layer 4 on the side of the positive electrode 2 is formed at the closest possible position to the electrode edge so as to partially overlap the insulation film 6, as shown in FIG. 3A. Therefore, space in the electrode stacked body can be reduced when stacking the bipolar electrodes 8', and mechanical strength of the periphery of the electrode can be increased.

According to the second embodiment, the insulation film 6 is structured to protrude outward beyond the collecting foil 1 with a protruding length longer than the thickness of one single cell, and to be at least partially adhered to the exposed portion 1a on the periphery of the collecting foil 1. Moreover, the insulation film 6 is flexible and adhesive. Disposition of this insulation film 6 facilitates the isolation of the electrodes within a single cell (single cell layer) and the isolation of the electrolytes between the cells, which can thereby prevent a short circuit at the electrode edge. Furthermore, as shown in FIG. 3B, neighboring insulation films 6 are adhered to each other, thereby ensuring the side of the cells be protected even more completely.

The embodiments shown in FIGS. 2A to 3B were those respectively having the insulation film 6 adhered to the exposed portion 1a only on the positive electrode side of the collecting foil 1. Nevertheless, the insulation films 6, if necessary, can be adhered to the exposed portions 1a on both positive and negative electrode sides of the collecting foil 1 as shown below in FIGS. 5A to 6B. In this case, if description is made regarding the non-adhesive insulation film 5 in FIGS. 5A and 5B as the adhesive insulation film 6 which is generally adhesive on one side, the adhesive surfaces of the insulation films 6 will face each other as they are disposed on the exposed portions 1a on both positive and negative electrode sides. Therefore, in order to join the adhesive films disposed in the respective single cells 10, each of the insulation films 6 on the negative electrode side can be adhesive on both sides, or on the bottom side (reverse side to the collector 1 side). When the bottom side is adhesive, the insulation film 6 is adhered to the exposed portion 1a of the collecting foil 1 by, for example, applying an appropriate adhesive material to the exposed portion 1a. Since a double-sided adhesive film does not allow for good handling, it is preferable to use an insulation film having a release paper or film, which is provided on at least one side of the adhesive surfaces and removed when adhering to the exposed portion 1a. Needless to say, it is possible to use a one-sided adhesive insulation film 6 similarly having a release paper or film.

Figure 4A:
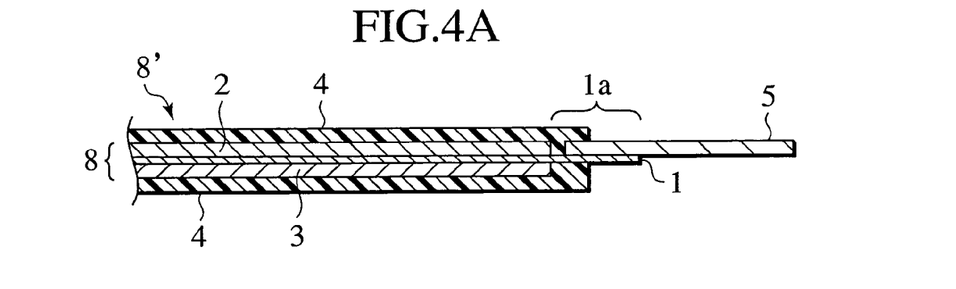
FIG. 4A is a cross-sectional view illustrating an edge of a bipolar electrode of the third embodiment according to the present invention.
Figure 4B:
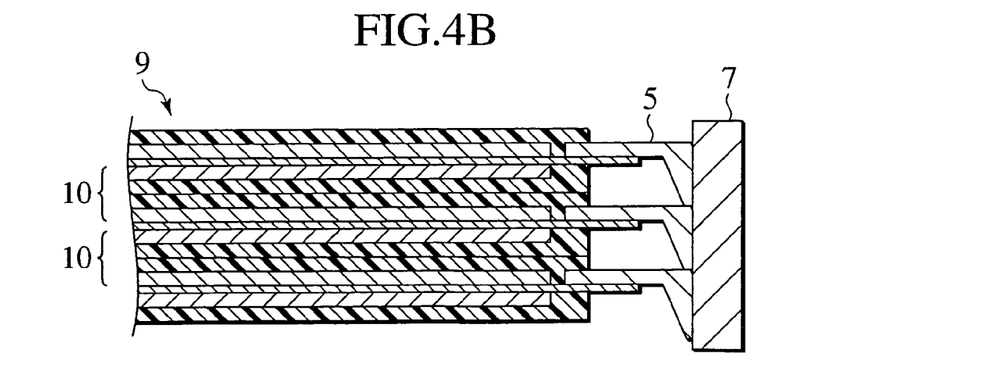
FIG. 4B is a cross-sectional view illustrating an edge of an electrode stacked body of a bipolar battery of the third embodiment according to the present invention.

As shown in FIGS. 4A and 4B, the third embodiment is constructed as follows. The bipolar electrode 8 is formed, in which exposed portions 1a having approximately the same length are formed in the peripheries of both sides of the positive and negative electrode layers 2 and 3 of the collecting foil 1. The insulation film 5 is disposed on a part of the exposed portion 1a on the side of the positive electrode layer 2. Further, polymer electrolyte layers 4 having approximately the same length are respectively formed on both positive and negative electrode layers 2 and 3, thus constituting the bipolar electrode 8' in which the polymer electrolyte layers 4 are formed in advance. The insulation film 5 is not adhesive and disposed on the entire periphery using an adhesive material, avoiding contact with the positive electrode layer 2. Here, the polymer electrolyte layers 4 having approximately the same length are respectively formed on both the positive and negative electrode layers 2 and 3. Therefore, it is advantageous in that the gap in the electrode stacked body can be eliminated when stacking the bipolar electrodes 8', and mechanical strength of the periphery of the electrode can be increased.

In the third embodiment, the insulation film 5 is structured to protrude outward beyond the collecting foil 1 with a protruding length longer than the thickness of one single cell, and to be partially adhered to the exposed portion 1a of the collecting foil 1. The insulation film 5 is also flexible, but is not adhesive. In the cell structured by stacking the plurality of bipolar electrodes 8', when the insulation films 5 are disposed as shown in FIG. 4B even without adhesiveness, isolation of the electrodes within the single cell 10 and between electrolytes of the cells can be easily achieved. For this reason, it is possible to prevent a short circuit at the edges of the electrodes. In addition, neighboring insulation films 5 are bent downward, and a thick adhesive insulation tape 7, that is, a constituent of the insulation layer on the other side, is adhered on the top of the bent portions. Accordingly, the edges of respective electrodes are covered by the insulation film 5, and further covered by the adhesive insulation tape 7. This provides the effect that the sides of the cell can be protected even more completely.

Figure 5A:
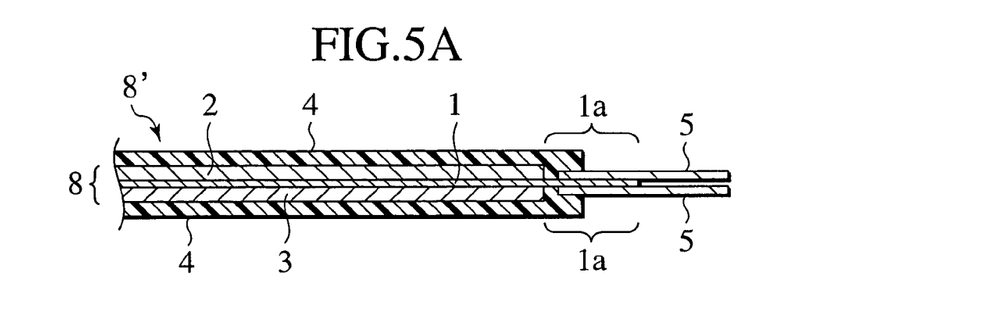
FIG. 5A is a cross-sectional view illustrating an edge of a bipolar electrode of the fourth embodiment according to the present invention.
Figure 5B:
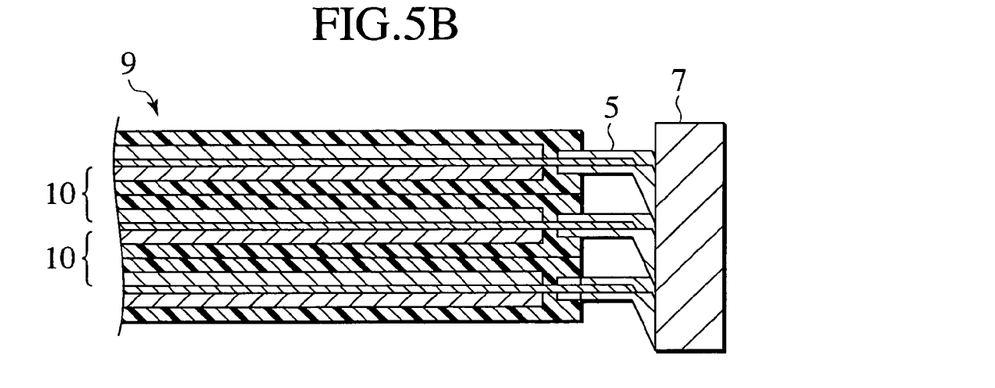
FIG. 5B is a cross-sectional view illustrating an edge of an electrode stacked body of a bipolar battery of the fourth embodiment according to the present invention.

As shown in FIGS. 5A and 5B, the fourth embodiment is constructed as follows. The bipolar electrode 8 is formed, in which the exposed portions 1a having approximately the same length are formed in the peripheries of positive and negative electrode layers 2 and 3 of the collecting foil 1. Insulation films 5 of approximately the same shape are respectively disposed on a part of each exposed portion 1a on each side of the collecting foil 1, at the position where the insulation films 5 are vertically overlapped. Each of the insulation films 5 are disposed on each side of the entire periphery of the collecting foil 1, avoiding contact with the positive and negative electrode layers 2 and 3. Further, the polymer electrolyte layers 4 having approximately the same length are respectively formed on both the positive and negative electrode layers 2 and 3, thus constituting the bipolar electrode 8' in which the polymer electrolyte layers 4 are formed in advance. Therefore, since polymer electrolyte layers 4 having approximately the same length are formed on both electrode layers similar to the aforementioned embodiments, the mechanical strength of the periphery of the electrode can be increased.

In the fourth embodiment, the insulation film 5 is structured to protrude outward beyond the collecting foil 1 with a protruding length longer than the thickness of one single cell, and to be partially adhered to the exposed portion 1$a$ of the collecting foil 1. The insulation film 5 is also flexible, but is not adhesive. In the cell structured by stacking the plurality of bipolar electrodes 8', when the insulation films 5 is disposed as shown in FIG. 5B even without adhesiveness, isolation of the electrodes within the single cell 10 and between electrolytes of the cells can be easily achieved. For this reason, it is possible to prevent a short circuit at the edges of the electrodes. In addition, neighboring insulation films 5 are bent downward, and a thick adhesive insulation tape 7, that is, a constituent of the insulation layer on the other side, is adhered on the top of the bent portions. Accordingly, the edges of respective electrodes are covered by the insulation film 5, and further covered by the adhesive insulation tape 7. This provides the effect that the sides of the cell can be protected even more completely.

It is possible to construct bipolar batteries provided with the electrode stacked bodies 9 having the periphery structures depicted in FIGS. 2B, 3B, 4B and 5B, respectively, by stacking the bipolar electrodes 8' of the forgoing embodiments. In FIGS. 2B and 3B, the insulation film 6 is a flexible and adhesive film. Therefore, the vertically-neighboring insulation films 6 adhere in sequence by merely stroking the films from the top in the direction of the arrow as shown in the drawings. Accordingly, the insulation films 6 provided on the periphery of each collecting foil 1 are adhered together, partially overlapping in sequence. Due to this, the sides of the cells are insulated even more completely. The insulation film 6 is preferably adhesive on one side only, for ease of handling.

When the insulation film 5 has flexibility, it is possible to stick the adhesive insulation tape 7 in an oblique direction from the top of the bipolar batteries in FIGS. 4B and 5B. The edge of each electrode is thereby covered by the insulation films 5, and further covered by the adhesive insulation tape 7. Accordingly, the edges of the electrodes are more difficult to crumble even when the cell receives some impact to its side. This is, as a matter of course, similarly applied to the bipolar batteries in FIGS. 2B and 3B.

As shown in FIG. 2C, the above-mentioned insulation films 5 and 6 are not particularly limited, and can be a film with the center portion removed, which is adhered to the periphery of the collecting foil 1. Alternatively, the insulation films and 6 can be formed by cut pieces of a tape-like film, each being adhered to each side of the exposed portions 1$a$ on the periphery of the collecting foils 1. In the case of using the film with the center portion removed, a cut 6' as in FIG. 2C or a notch can be made in the corner or the periphery thereof as needed. This is in order that, when the flexible insulation films 5, 6 provided on the peripheries of the respective collecting foils 1 adhere together partially overlapping in sequence after the bipolar electrodes 8 are stacked, the films 5, 6 are less susceptible to creasing at the corners and elsewhere. The films can adhere smoothly so as to overlap in series without creating gaps at any point of adhesion.

A material for the flexible insulation film preferably employed in these embodiments can be exemplified by Kapton film (product name of a polyimide film by DuPont), a polyester film, a polyolefin film, Teflon film (product name of a polytetrafluoroethylene by DuPont) and the like, but should not be limited to these films. In order to provide adhesiveness to these films, for example, an adhesive layer is formed on either one side or both sides of the respective film base materials. It is also possible to use a permanent adhesive material (for example, an acrylic adhesive material) which can provide permanent adhesion after sticking. This is in order that, the insulation structure can be stably maintained for a long period of time by virtue of the strong adhesion, despite a reduction in the flexibility of the films after sticking.

As for the thickness of the insulation film 5, 6 preferably employable to these embodiments, it is preferable to use a thin insulation film which is as thin as or thinner than the positive or negative electrode layer 2 or 3 on the collecting foil 1 as shown in FIG. 2A. If the film 5, 6 is thicker than the positive or negative electrode layer 2 or 3 on the collecting foil 1, the periphery becomes thicker than the center portion when a plurality of films 5, 6 are stacked. Therefore, the periphery is swelled up, causing a greater difficulty in stacking as the number of stacked layers increases. This can also cause strain in the periphery. Additionally, the electrodes and polymer electrolyte layers 4 may be peeled or cracked in the periphery.

Meanwhile, the thickness of the adhesive insulation tape 7 is not necessarily required to be thinner than the electrode layer. It is rather preferable to use thick insulation tape for prevention of a short circuit incurred by some form of burrs in the electrode layers 2 and 3, and polymer electrolyte layer 4 that has partially crumbled due to contact with an object. The adhesive insulation tape 7 having a thickness of approximately 100 to 500 μm can be preferably utilized. However, the insulation tape is still usable even if the thickness thereof is not within this range, unless the effects of the present invention are impeded.

Hereinbefore, description has been provided with reference to FIGS. 2A to 5B regarding the embodiments of the cell in which the insulating layer is provided on the periphery on at least one side of the collecting foil. Needless to say, however, the present invention is not limited to these embodiments. For example, other embodiments shown in FIGS. 6A to 7B among the below-mentioned embodiments can also be included in the present invention. Moreover, other constituents of the bipolar battery should not be limited. Although other constituents will be briefly described below, it is obvious that the present invention should not be limited to them.

Hereinafter, the power generating element of the present invention will be described in detail.

The positive and negative electrode layers 2 and 3 of the earlier-described electrode layers contain a positive and negative electrode active material, respectively, and also contain a solid polymer electrolyte within the layers. Besides, lithium salt, a conductive material and the like can be contained for enhancing ion conductivity. This solid polymer electrolyte is made of polymer containing a lithium salt and a polar group. The lithium salt and polar group act as liquid electrolyte and a binder of a liquid electrolyte cell. In order to obtain a smooth ion movement within the electrode layers, it is preferable to fill with this solid polymer electrolyte the gaps among the electrode active material particles in the electrode layers. Moreover, a polymer gel electrolyte can be used if it does not cause a short circuit between the electrolyte layers between different cells.

The optimum ratio of the solid polymer electrolyte to be filled in the electrode layer varies depending on the intended usage of the cell (for high power, high energy or the like) and the ion conductivity. However, if the amount of the solid polymer electrolyte is too small, resistances to ion conductivity and ion diffusion in the electrode become large. An excessive amount of the solid polymer electrolyte causes a reduction in the energy density of the cell to be constructed. For a cell in which reactivity is prioritized, if the ion conductivity of the solid polymer electrolyte is at the present level ($10^{-5}$ to $10^{-4}$ S/cm), the amount of conductive material is increased or the bulk density of electrode active material decreased. Accordingly, resistance to electron conduction among active ingredient particles is kept low, while simultaneously increasing gaps into which the polymer electrolyte is filled. In this way, the filling ratio of the solid polymer electrolyte is increased.

A polymer for use of the solid polymer electrolyte in the present invention is not limited, but can be polyethylene oxide (PEO), polypropylene oxide (PPO), or a polymer obtained by copolymerization of the two, and each of them is a polymer synthesized by radical polymerization using a raw polymer having carbon-carbon double bond in the molecule. This type of polyalkylene oxide polymers can adequately dissolve lithium salt such as $LiBF_4$, $LiPF_6$, $LiN(SO_2CF_3)_2$ and $LiN(SO_2C_2F_5)_2$, and has a good mechanical performance if it is in a crosslinking structure.

The bipolar electrode for use in the present invention is constructed as follows. Slurry is prepared by mixing the raw polymers mentioned above, a positive or negative electrode active material, a conductive material, lithium salt, solvent, and a small amount of thermal polymerization initiator such as azobisisobutyronitrile (AIBN). This slurry is coated on a collector and heated to form an electrode layer (for example, a negative electrode layer) on one side. Another electrode layer (for example, a positive electrode layer) is formed on the other side of the collector in the same manner. The positive and negative electrode layers can be formed in reverse order. Polymer electrolyte layers can be further formed on the electrode layers in the following way. The electrode layers are coated with a solution containing lithium salt, the raw polymer and photopolymerization initiator, and are thereafter covered by transparent films of PET or the like. Further, by being irradiated with ultraviolet rays for 10 to 20 minutes, the polymer electrolyte layer is provided. However, the polymer electrolyte layer is not limited to this.

The collecting foil usable for the present invention is preferably an aluminum foil, a stainless steel foil, a clad material made of nickel and aluminum, a clad material made of copper and aluminum or a plated material obtained by combining the above metals. The collecting foil can also be made by covering aluminum on a metal surface. It is also possible to use a collecting foil made by sticking two or more metal foils together. The thickness of the collecting foil is not particularly limited, but is usually in the order of 1 to 100 μm.

The positive electrode active material, which is not particularly limited, is spinel $LiMn_2O_4$, for example. Apart from spinel $LiMn_2O_4$, it is possible to use composite oxide of transition metal and lithium, which is used for a liquid lithium ion battery. Specifically, Li—Co based composite oxide such as $LiCoO_2$, Li—Ni based composite oxide such as $LiNiO_2$, Li—Mn based composite oxide such as spinel $LiMn_2O_4$, and Li—Fe based composite oxide such as $LiFeO_2$ can be listed. In addition, phosphate compound or sulfate compound of transition metal and lithium such as $LiFePO_4$, transition metal oxide or sulfide such as $TiS_2$, $MoS_2$ and $MoO_3$, and sulfide such as $PbO_2$, AgO and NiOOH can also be listed. It is preferable to use a positive electrode active material with a particle size smaller than that of the ingredients generally used for a liquid lithium ion battery, in order to reduce the electrode resistance of the cell. Specifically, the preferable average particle size of the positive electrode active material is between 0.1 to 10 μm.

For the negative electrode active material, it is possible to use an ingredient used for a liquid lithium ion battery. From the viewpoint of reactivity in the solid polymer electrolyte, however, it is preferable to use composite oxide of transition metal and lithium or transition metal oxide as it can take in/out lithium through electric charge/discharge. Among them, titanium oxide and composite oxide of titanium and lithium can be preferably used.

The conductive material can be acetylene black, carbon black, graphite or the like, but is not limited to these.

The blended amount of the positive and negative electrode active material, solid polymer electrolyte, lithium salt and conductive material, should be decided in consideration of the intended usage of the battery (prioritizing power or energy, for example) and ion conductivity. For example, if the blended amount of the solid polymer electrolyte in the electrode layer is too small, resistances to ion conductivity and ion diffusion become high within the electrode layer, thus degrading the cell performance. On the other hand, the excessive blended amount of the solid polymer electrolyte in the electrode layer reduces the energy density of the cell. Therefore, the blended amount of the solid polymer electrolyte, which is adequate for the purpose, is decided in view of these factors.

The thickness of each electrode layer is not particularly limited, but should be decided in consideration of the intended usage of the battery and ion conductivity as mentioned above regarding the blended amount. In general, the thickness of the electrode layer is in the order of 10 to 500 μm.

Similar to the solid polymer electrolyte, a polymer electrolyte film is, for example, polyethylene oxide (PEO), polypropylene oxide (PPO), or a polymer obtained by copolymerization of the two. The possible method of forming this polymer electrolyte thin film includes, but is not limited to, the following. Lithium salt and a raw polymer, which has carbon-carbon double bond in the molecule, are dissolved in solvent such as N-methyl-2-pyrrolidone (NMP). The resultant solution is poured into an optically transparent gap in which the thickness is determined by a spacer, and thereafter crosslinked by irradiation with ultraviolet rays. The polymer electrolyte film can also be made by radiation polymerization, electron beam polymerization or thermal polymerization. An appropriate photopolymerization initiator and thermal polymerization initiator can be used in the case of ultraviolet polymerization and a thermal polymerization, respectively. Lithium salt to be dissolved includes, but is not limited to, $LiBF_4$, $LiPF_6$, $LiN(SO_2CF_3)_2$, $LiN(SO_2C_2F_5)_2$, or a mixture of the two or more of them. Further, this polymer electrolyte film is formed in a crosslinking structure, thus resulting in a good mechanical performance.

The polymer electrolyte can be contained in the polymer electrolyte layer, and positive and negative electrode layers. The same polymer electrolyte can be used for all of these layers, but it is also possible to use different polymer electrolyte in each of the layers.

The thickness of the polymer electrolyte layer is not particularly limited. However, in order to obtain a compact bipolar battery, the thinnest possible layer is preferable within a thickness range that ensures the functions of the polymer electrolyte layer. In general, the thickness of the polymer electrolyte layer is in the order of 5 to 200 μm.

The raw polymer preferably used is a polyether-based polymer such as PEO or PPO. Therefore, oxidization resistance on the positive electrode side is low under a condition at high temperature. Accordingly, in the case of using a positive electrode ingredient with a high oxidization-reduction potential, which is generally used in a liquid lithium ion battery, it is preferable that the capacity of the negative electrode is smaller than that of the positive electrode that faces the negative electrode through the solid polymer electrolyte layer. When the capacity of the negative electrode is smaller than that of the opposing positive electrode, it is possible to prevent a positive potential from becoming too high at the end of charging. However, when the capacity of the negative electrode is smaller than that of the opposing positive electrode, the negative potential may go too low, resulting in deterioration of durability of the cell. Therefore, attention to the charge/discharge voltages is required.

The bipolar battery of the present invention is used for a lithium ion secondary battery in which charge and discharge is mediated by lithium ion movement. However, this does not exclude application of different types of batteries, as long as an effect such as an improved battery performance can be obtained.

As shown in FIGS. 8 to 12, the bipolar battery of the present invention is constructed as follows. The bipolar electrodes in the embodiments described earlier are stacked to form the electrode stacked body 9. Thereafter, the insulation layers are formed in the stack 9 by adhering the insulation films 5 or 6 on the periphery of each layer. The stack 9 is encapsulated in the battery packaging material 13 under reduced pressure. The electrode leads 11 and 12 extend from the battery packaging material 13. Here, the electrodes 8a and 8b are the uppermost and lowermost layers of the electrode stacked body 9 in which the plurality of bipolar electrodes 8 and the like are stacked. These electrodes 8a and 8b are not necessarily required to have the bipolar electrode structure, and can have a structure where only a required electrode layer is disposed on one side of the collecting foil (see FIG. 11). Furthermore, in the bipolar battery 20, the positive and negative leads 11 and 12 are attached to the collecting foils 1 at the bottom and top, respectively.

Moreover, it is not necessary to provide the insulation layer formed by the insulation film 5 or 6 and the adhesive insulation tape 7 on the periphery on at least one side of the collecting foils 1 of the electrodes 8a and 8b. This is in order that the insulation structure among all electrodes and among all cells of the entire electrode stacked body 9, that is, the bipolar battery 20 can be achieved, due to the fact that the collecting foils 1 of the bipolar electrodes excluding the electrodes 8a and 8b have the insulation layer formed by the insulation film 5 or 6 and the adhesive insulation tape 7. However, it goes without saying that it is possible to provide the insulation layer formed by the insulation film 5 or 6 and the adhesive insulation tape 7, as shown by a dotted line in FIG. 11, on the periphery on at least one side of either of the collecting foil 1 of the electrodes 8a and 8b.

Furthermore, the bipolar battery 20 of the present invention has a structure in which the electrode stacked body 9 is encapsulated by the battery packaging material 13 under reduced pressure, and the electrode leads 11 and 12 extend from the battery packaging material 13. This structure is to prevent impact from outside or environmental deterioration while using the battery. From the viewpoint of lightweightedness, it is preferable to use a battery packaging material such as a polymer-metal composite laminate film including an aluminum laminate packaging material, in which metal (including alloys) such as aluminum, stainless steel, nickel, or copper is covered with an insulator such as a polypropylene film. Preferably, the electrode stacked body is housed in the battery packaging material and encapsulated therein under reduced pressure by joining the peripheries of the packaging material partially or entirely by thermowelding. The electrode leads are led out of the battery packaging material.

Figure 13:
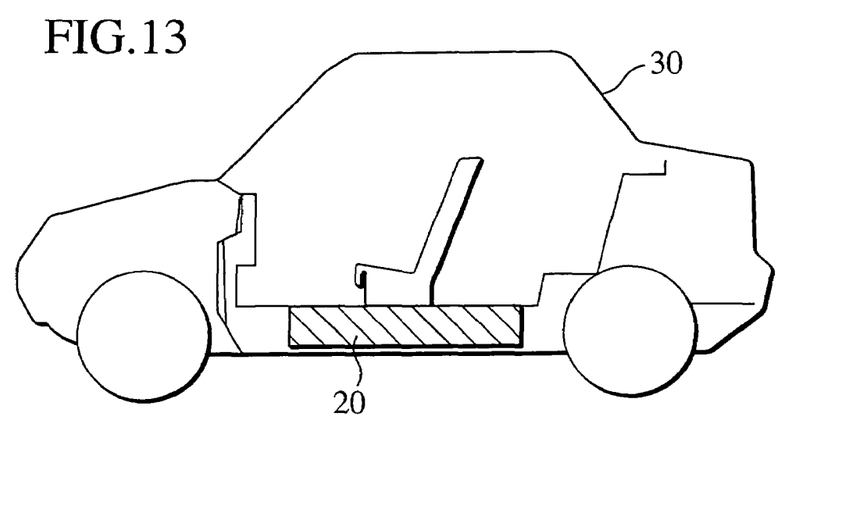
FIG. 13 is a schematic view illustrating a vehicle, on which the bipolar battery of the present invention is mounted.

Next, a vehicle 30 of the present invention is characterized by having a power source formed by one or more bipolar battery(s) 20 of the present invention. (see FIG. 13) This bipolar battery 20 is, as described earlier, very compact, easy to manufacture, unlikely to incur a short circuit, and capable of ensuring a good insulation structure between electrodes and between cells. In the vehicle of the present invention, this bipolar battery 20 is used to form a large capacity power source for vehicle use. Therefore, improvements are seen in life and quality performances of a battery in which high energy and power densities can be achieved, and thereby it is possible to provide vehicles carrying a safe and stable power source. This is a great contribution to the industry.

The vehicle of the present invention includes an electric vehicle, a hybrid electric vehicle, a fuel cell vehicle, an internal combustion engine vehicle and the like. Further, when the bipolar battery(s) is mounted on the vehicle of the present invention as the vehicle power source, the bipolar battery(s) is placed in the vicinity of the heat source such as an engine, a motor, or a radiator. Therefore, the surroundings of the bipolar battery(s) can be maintained under a high temperature environment by utilizing heat release (heat discharge) from the heat source. Owing to this, it is possible to create relatively easily an environment in which good cell performance is realized, even with the solid polymer electrolyte.

Hereinbelow, Examples of the present invention and Comparative Example will be described. For the polymer electrolyte, polyether-based network polymer was used, which was synthesized in compliance with the method explained in the literature (J. Electrochem. Soc., 145 (1998) 1521.). For the lithium salt, $LiN(SO_2C_2F_5)_2$ (hereinafter referred to as BETI) was used.

First of all, the polymer electrolyte film was prepared in the following manner. Solution was prepared by adding 53 wt % of the earlier-described raw polymer, 26 wt % of BETI as lithium salt, and benzil dimethyl ketal as a photo polymerization initiator, which is 0.1 wt % of the raw polymer, into dry acetonitrile as a solvent. Thereafter, acetonitrile was removed by vacuum distillation. After the thickness was defined by Teflon spacer, this solution with high viscosity was filled between glass plates, and photo polymerization took place by 20-minute irradiation with ultraviolet rays. The film was removed and put into a vacuum container, where the film was heated and dried for 12 hours at 90 degrees centigrade under a high vacuum to remove residual water and solvent.

The negative electrode layer was prepared as follows. For the negative electrode active material, $Li_4Ti_5O_{12}$ was used. Slurry of the negative electrode was prepared by adding 28 wt % of the negative electrode active material, 3 wt % of acetylene black as a conductive material, 17 wt % of the earlier-described raw polymer, 8 wt % of BETI as lithium salt, and azobisisobutyronitrile as a thermal polymerization initiator, which is 0.1 wt % of the raw polymer. Further, 44 wt % of NMP was added as a solvent to the product thus obtained and thoroughly stirred, thereby preparing the slurry of the negative electrode. This slurry of the negative electrode was coated on one side of a collecting foil using a die coater, and heated and dried within a vacuum dryer for more than 2 hours at 90 degrees centigrade. Consequently, the negative electrode layer with a thickness of 55 µm was formed.

The positive electrode layer was prepared as follows. For the positive electrode active material, $LiMn_2O_4$ having a average particle size of 2 µm was used. Slurry of the positive electrode was prepared by adding 29 wt % of the positive electrode active material, 8.7 wt % of acetylene black as a conductive material, 17 wt % of the earlier-described raw polymer, 7.3 wt % of BETI as lithium salt, and azobisisobutyronitrile as a thermal polymerization initiator, which is 0.1 wt % of the raw polymer. Further, 41 wt % of NMP was added as a solvent to the product thus obtained and thoroughly stirred, and thereby preparing the slurry of the positive electrode. Pattern coating of slurry of the positive electrode was performed using a die coater on the other side of the collecting foil having the negative electrode layer. The pattern coating was carried out in a manner which left the periphery of the collecting foil uncoated. The slurry of the positive electrode on the collecting foil was then heated and dried within a vacuum dryer for more than 2 hours at 90 degrees centigrade. Consequently, the positive electrode layer with a thickness of 60 µm was formed.

The polymer electrolyte layer on the negative or positive electrode layer was formed in the following manner. The same solution as that for forming the earlier-mentioned polymer electrolyte film was used. Pattern coating was employed for applying this solution on the negative or positive electrode layer using a die coater. This was covered by a PET film on which release agent was coated, and then crosslinked and solidified by irradiation with ultraviolet rays.

Next, examples will be shown in which combinations of the above processes are employed.

EXAMPLE 1

The bipolar electrode 8' shown in FIG. 2A was prepared in the following manner. First, a 20 µm-thick stainless steel foil (SUS316L) was used as the collecting foil 1. The size of the positive electrode layer 2 was set to 80 mm×150 mm. The width of the exposed portion 1*a* of the collecting foil 1 was set to 5 mm. The foregoing slurry of the negative electrode was coated on one surface of the collecting foil 1 using a coater, and then thermal polymerization took place in a vacuum oven, thereby forming the negative electrode layer 3. The polymer electrolyte layer 4 was formed on the negative electrode layer 3 in the method described earlier. Pattern coating of the slurry of the positive electrode was carried out on the opposite surface of the collecting foil 1 using a die coater so that the edge thereof was formed as shown in FIG. 2A. Thereafter, thermal polymerization took place in a vacuum oven in the same manner as the above, thereby forming the positive electrode layer 2. Here, the insulation film 6 was adhered to the exposed portion 1*a* on the side of the positive electrode layer 2 of the collecting foil 1. The insulation film 6 used was a thin Kapton adhesive film having a thickness of 50 µm, and was flexible and adhesive on one side. The same type of films was used in the following Examples. Next, after the PET film on the polymer electrolyte layer 4 was peeled off, heating and drying under the high vacuum were performed, thereby completing the preparation of the bipolar electrode 8' shown in FIG. 2A.

The plurality of bipolar electrodes 8' were stacked and adhered together, while at the same time aligning the edges of the same. In addition, the insulation films 6 were adhered together by stroking them down from the opposite sides of the adhesive surfaces of the adhesive insulation films 6, as shown in FIG. 2B. In this way, the insulation layer formed by the insulation film 6 was provided on the periphery on one side of each collecting foil 1.

Figure 11:
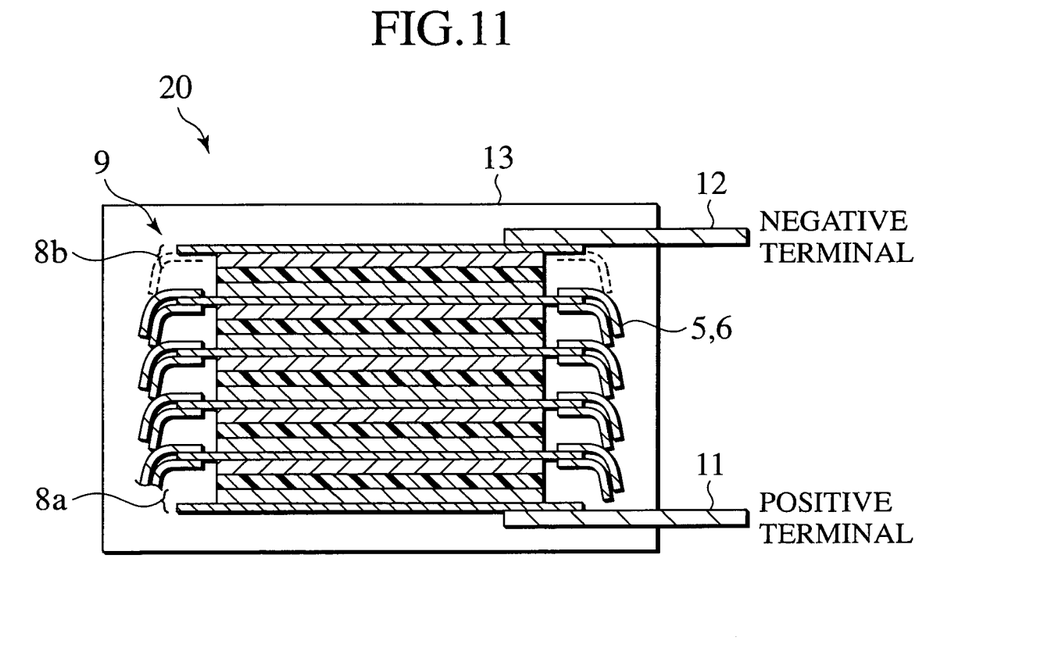
FIG. 11 is a schematic cross-sectional view illustrating a basic structure of the bipolar battery according to the present invention.

As shown in FIGS. 11 to 12, the electrode stacked body 9 having eleven electrode layers was formed. For the electrodes of the uppermost and lowermost layers of these layers, the electrodes 8*a* and 8*b* were used. In the electrodes 8*a* and 8*b*, which did not have the structure of the bipolar electrode 8, a required electrode layer 2 or 3 was disposed only on one side of the collecting foil 1. Then, the positive and negative leads 11 and 12 were respectively attached by welding on the collecting foils 1 at the bottom and top. This electrode stacked body 9 was structured to have ten single cells 10 that were serially connected. The electrode stacked body 9 was encapsulated in the battery packaging material 13 under reduced pressure, and the bipolar battery 20 was prepared to have a structure in which only the positive and negative leads 11 and 12 extended from the battery packaging material 13. For the battery packaging material 13, an aluminum laminate film was used.

EXAMPLE 2

After the process of adhering the insulation film in Example 1, the polymer electrolyte layer 4 was formed on the positive electrode layer 2 so that the edge thereof became as shown in FIG. 3A. After the PET film was peeled off, heating and drying was carried out under the high vacuum, and thereby completing the preparation of the bipolar electrode 8' shown in FIG. 3A.

The plurality of bipolar electrodes 8' were stacked and adhered together while at the same time aligning the edges of the same. In addition, the insulation films 6 were adhered together by stroking them down from the opposite sides of the adhesive surfaces of the adhesive insulation films 6, as shown in FIG. 3B. In this way, the insulation layer formed by the insulation film 6 was provided on the periphery on one side of each collecting foil 1.

Thereafter, in the same manner as Example 1, eleven electrode layers were stacked, and the electrode leads 11 and 12 were attached to the collecting foils 1 at the bottom and top. The electrode stacked body 9 was encapsulated in the battery packaging material 13 under reduced pressure, and the bipolar battery 20 was prepared to have a structure in which only the electrode leads 11 and 12 extended from the battery packaging material 13.

EXAMPLE 3

The bipolar electrode 8' shown in FIG. 4A was prepared in the following manner. For the collecting foil 1, a 20 µm-thick stainless steel foil (SUS316L) was used. The slurry of the negative electrode was coated on one surface of the collecting foil 1 using a die coater, so that the edge thereof was formed as shown in FIG. 4A. Thermal polymerization then was performed in a vacuum oven, thereby forming the negative electrode layer 3. Pattern coating of the slurry of the positive electrode was carried out on the opposite surface of the collecting foil 1 using a die coater so that the edge thereof was formed as shown in FIG. 4A. Thereafter, thermal polymerization took place in a vacuum oven in the same manner as the above, thereby forming the positive electrode layer 2. The insulation film 5 was adhered to the exposed portion 1a on the side of the positive electrode layer 2 of the collecting foil 1. The insulation film 5 used was a thin and flexible Kapton film having a thickness of 7 μm. Moreover, since the insulation film 5 is not adhesive, adhesive material was applied on the region to which the insulation film was adhered. This region was in the exposed portion 1a on the side of the positive electrode layer 2 of the collecting foil 1. Thereafter, the insulation film 5 was adhered to the region.

After adhering the insulation film 5, similarly to Example 2, the polymer electrolyte layers 4 were respectively formed on the negative and positive electrode layers 3 and 2 so that the edge thereof became as shown in FIG. 4A. After peeling off the PET film, as well as heating and drying under the high vacuum, the bipolar electrode 8' shown in FIG. 4A was prepared.

The plurality of bipolar electrodes 8' were stacked and adhered together while at the same time aligning the edges of the same. In addition, the adhesive insulation tape 7 was stuck on top of the insulation films 5 as shown in FIG. 4B. In this way, the insulation layers, formed by the insulation films 5 and adhesive insulation tape 7, were provided on the peripheries of respective collecting foils 1. The adhesive insulation tape 7 used was a 200 μm-thick Teflon tape, which is flexible and adhesive on one side.

Thereafter, in the same manner as Example 1, eleven electrode layers were stacked, and the electrode leads 11 and 12 were attached to the collecting foils 1 at the bottom and top. The electrode stacked body 9 was encapsulated in the battery packaging material 13 under reduced pressure, and the bipolar battery 20 was prepared to have a structure in which only the electrode leads 11 and 12 extended from the battery packaging material 13.

EXAMPLE 4

The bipolar electrode 8' shown in FIG. 5A was prepared in the same manner as Example 3, except that the insulation films 5 were adhered to both sides of the collecting foil 1. The plurality of bipolar electrodes 8' were stacked and adhered together. As shown in FIG. 5B, the adhesive insulation tape 7 was adhered on the top of the insulation films 5, and the bipolar battery 20 having eleven electrode layers was prepared to have a structure in which the electrode leads 11 and 12 extended from the battery packaging material 13. In this way, the insulation layers, formed by the insulation films 5 and the adhesive insulation tape 7, were provided on the peripheries of both sides of the respective collecting foils 1.

EXAMPLE 5

Figure 6A:
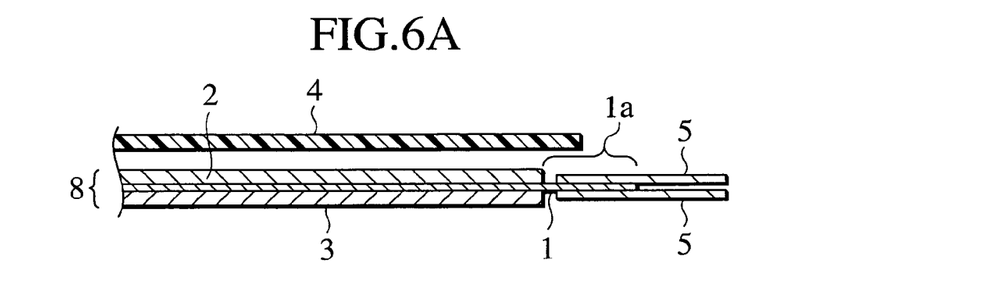
FIG. 6A is a cross-sectional view illustrating an edge of a bipolar electrode of the fifth embodiment according to the present invention.
Figure 6B:
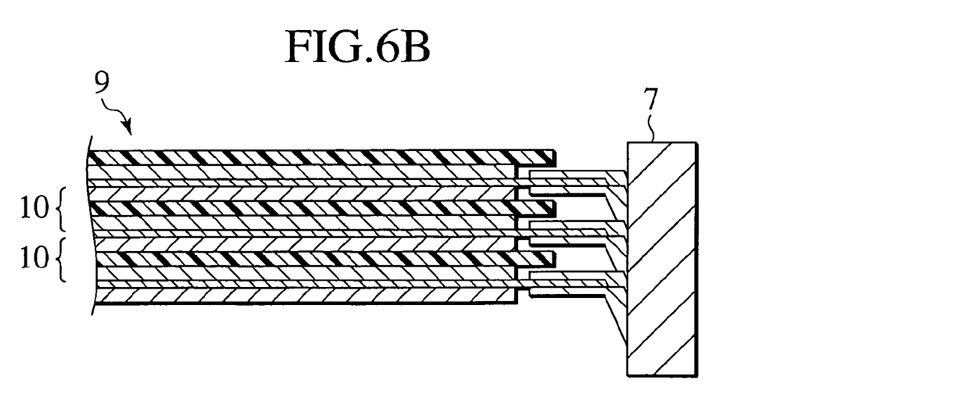
FIG. 6B is a cross-sectional view illustrating an edge of an electrode stacked body of a bipolar battery of the fifth embodiment according to the present invention.

Similarly to Example 3, the bipolar electrode 8 shown in FIG. 6A was prepared in the following manner. The electrode layers 2 and 3 were formed on both sides of the collecting foil 1. The insulation films 5 were then adhered to both sides of the collecting foil 1. The polymer electrolyte film 4 with a thickness of 50 μm was formed by the method of preparing the polymer electrolyte film described earlier. The bipolar electrodes 8 were stacked sandwiching the polymer electrolyte film 4 therebetween, thus constructing the electrode stacked body 9 of the bipolar battery as shown in FIG. 6B. In the same manner as Example 4, the adhesive insulation tape 7 was adhered on the top of the insulation films 5, and the bipolar battery 20 having eleven electrode layers was prepared to have a structure in which the electrode leads 11 and 12 extended from the battery packaging material 13. In this way, the insulation layers, formed by the insulation films 5 and adhesive insulation tape 7, were provided on the peripheries on both sides of the respective collecting foils 1.

EXAMPLE 6

Figure 7A:
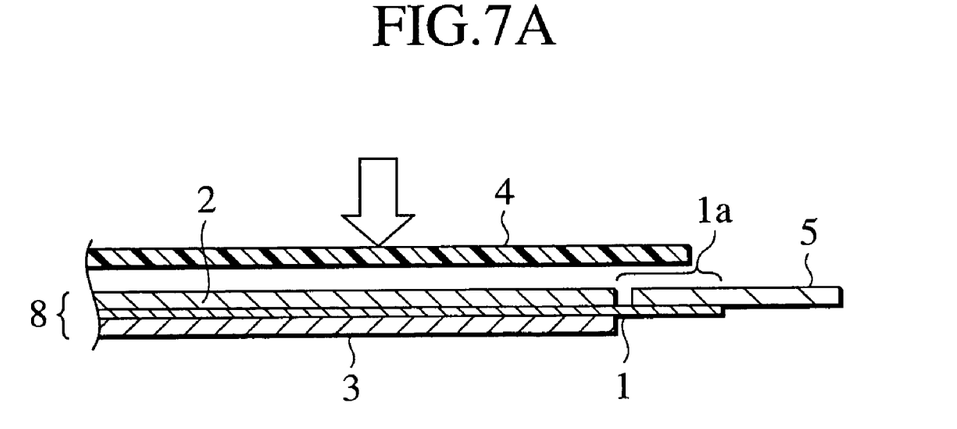
FIG. 7A is a cross-sectional view illustrating an edge of a bipolar electrode of the sixth embodiment according to the present invention.
Figure 7B:
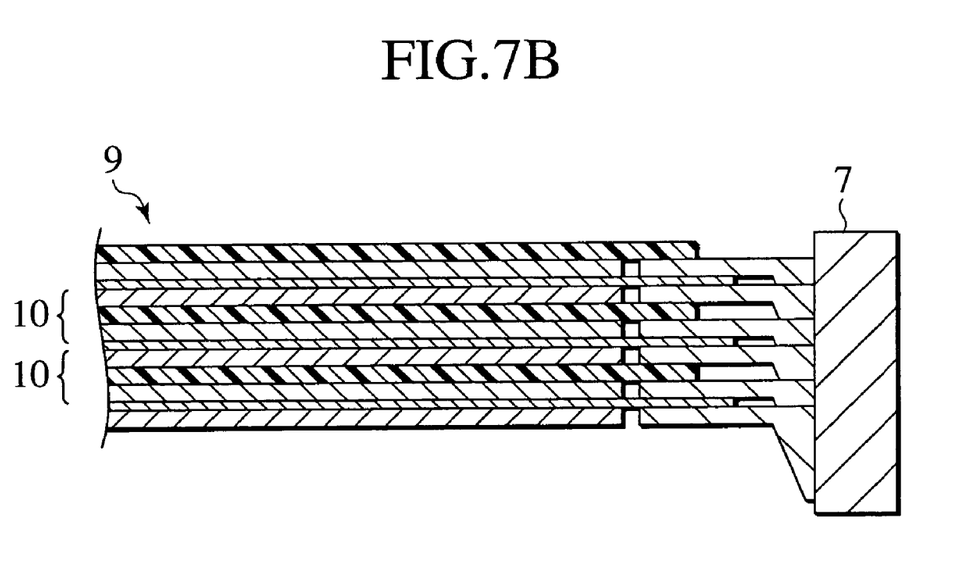
FIG. 7B is a cross-sectional view illustrating an edge of an electrode stacked body of a bipolar battery of the sixth embodiment according to the present invention.

The bipolar batteries 20 shown in FIGS. 7A and 7B were prepared in the same manner as Example 5, except that the insulation film 5 were adhered only on the positive electrode side of the collecting foil 1. Further, the adhesive insulation tape 7 was adhered on top of the insulation films 5, in the same manner as Example 5. In this way, the insulation layers, formed by the insulation film 5 and adhesive insulation tape 7, was provided on the periphery on one side of each collecting foil 1.

COMPARATIVE EXAMPLE 1

Figure 14A:
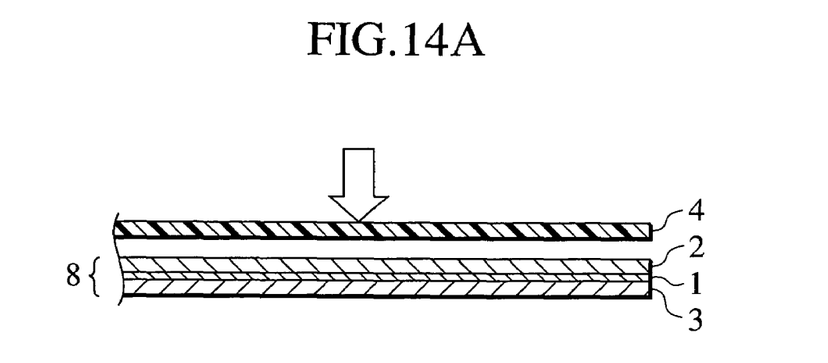
FIG. 14A is across-sectional view illustrating a bipolar electrode of the comparative example 1.

The bipolar electrode 8 shown in FIG. 14A was prepared in the following manner. First, a 20 μm-thick stainless steel foil(SUS316L) was used as the collecting foil 1. The foregoing slurry of the negative electrode was coated on one surface of the collecting foil 1 using a coater, and then thermal polymerization took place in a vacuum oven, thereby forming the negative electrode layer 3. The slurry of the positive electrode was coated on the other side of the collecting foil 1 using a coater, and thermal polymerization took place in a vacuum oven similarly to the above, thereby forming the positive electrode layer 2. Consequently, the bipolar electrode 8 shown in FIG. 14A was prepared.

Figure 14B:
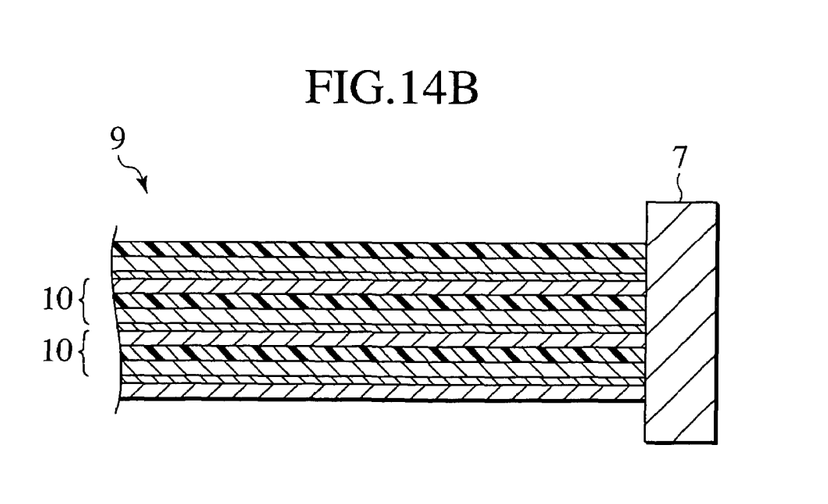
FIG. 14B is a cross-sectional view illustrating an electrode stacked body of a bipolar battery of the comparative example 1.

Next, the bipolar battery 20 of FIG. 14B was formed as follows. The plurality of stacked bipolar electrodes 8 of FIG. 14A were adhered together while at the same time aligning the edges of the same, and sandwiching therebetween the polymer electrolyte film 4 used in Example 5. The adhesive insulation tape 7 was then adhered to the side of the electrode stacked body 9 so that the area of the positive electrode layer 2 became the same as those in Examples. Thereafter, in a similar manner to Example 1, the bipolar battery 20 having eleven electrode layers was prepared to have a structure in which the electrode leads 11 and 12 extended from the battery packaging material 13.

In addition, a bipolar battery 20 was prepared without sticking the adhesive insulation tape 7 on the side of the electrode stacked body 9, similarly to a structure disclosed in Japanese Patent Application Laid-Open No. H8-7926. In the bipolar battery 20, when the edge surface of the electrode stacked body 9 was touched to align the edges thereof, the electrode layers 2 and 3 and the polymer electrolyte layer 4 were partially crumbled, bent and chipped off. It was confirmed that the crumbled portion caused scratches on battery packaging materials, and the bent portion caused burrs which would result in a short circuit. A chip of the end portions of the electrode layer and the like was stuck to the end of a different electrode layer. Due to the fact that there were many single cell layers that were highly likely to induce a short circuit, it was difficult to conduct a charge and discharge test using the cell as it was. Therefore, the bipolar battery of Comparative Example 1 was used for the evaluation testing as described below, whereby the conventional technology was partially improved to emulate the present invention. Hence, Comparative Example 1 does not correspond to the conventional technology.

Evaluation of Bipolar Batteries

Each of the prepared bipolar batteries was charged with constant current and constant voltage at 0.2 C up to 27 V for 10 hours in total. Thereafter, each battery was left for 3 days. The batteries of Examples 1 to 6 indicated voltages of 25 to 26 V. However, since the battery of Comparative Example 1 had a voltage of 17.5 V, some parts of the single cell layers were considered to have short circuits.

As is evident as described above, according to the present invention, it is possible to provide a bipolar battery having an insulation structure between electrodes and between cells, in which a short circuit does not occur at the end of each electrode layer of the battery.

The entire content of a Japanese Patent Application No. P2002-294933 with a filing date of Oct. 8, 2002 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A bipolar battery, comprising:
a plurality of bipolar electrodes, each having a positive electrode layer on one side of a collecting foil and a negative electrode layer on the other side of the collecting foil;
a plurality of polymer electrolyte layers, each disposed between the bipolar electrodes; and
a plurality of insulation layers, each of the insulation layers being provided on an exposed portion in a periphery of at least one side of the collecting foil, being a flexible and adhesive insulation film, and being protruded outward beyond the collecting foil with a protruding length longer than a thickness of one single cell, the single cell being composed of the positive electrode layer, the negative electrode layer and the electrolyte layer therebetween,
wherein the insulation layers are bent to partially overlap each other, in order to isolate the positive electrode layer from the negative electrode layer within the single cell and to isolate between the electrolyte layers of the neighboring single cells.

2. A bipolar battery according to claim 1,
wherein the insulation film has an opening in which the positive electrode layer or the negative electrode layer is disposed.

3. A bipolar battery according to claim 2,
wherein a cut or a notch is made in a corner or a periphery of the insulation film.

4. A vehicle, comprising;
a power source having a bipolar battery,
the bipolar battery, comprising: a plurality of bipolar electrodes, each having a positive electrode layer on one side of a collecting foil and a negative electrode layer on the other side of the collecting foil; a plurality of polymer electrolyte layers, each disposed between the bipolar electrodes; and a plurality of insulation layers, each of the insulation layers being provided on an exposed portion in a periphery of at least one side of the collecting foil, being a flexible and adhesive insulation film, and being protruded outward beyond the collecting foil with a protruding length longer than a thickness of one single cell, the single cell being composed of the positive electrode layer, the negative electrode layer and the electrolyte layer therebetween,
wherein the insulation layers are bent to partially overlap each other, in order to isolate the positive electrode layer from the negative electrode layer within the single cell and to isolate between the electrolyte layers of the neighboring single cells.

5. A vehicle according to claim 4,
wherein the insulation film has an opening in which the positive electrode layer or the negative electrode layer is disposed.

6. A vehicle according to claim 5,
wherein a cut or a notch is made in a corner or a periphery of the insulation film.

7. A bipolar battery, comprising:
a plurality of bipolar electrodes, each having a positive electrode layer on one side of a collecting foil and a negative electrode layer on the other side of the collecting foil;
a plurality of polymer electrolyte layers, each disposed between the bipolar electrodes; and
a plurality of insulation layers, each of the insulation layers being provided on an exposed portion in a periphery of at least one side of the collecting foil, being a flexible insulation film, and being protruded outward beyond the collecting foil with a protruding length longer than a thickness of one single cell, the single cell being composed of the positive electrode layer, the negative electrode layer and the electrolyte layer therebetween,
wherein the insulation layers are bent to partially overlap each other, and an insulation tape further covers the bent insulation layers, so that the insulation layers and the insulation tape isolate the positive electrode layer from the negative electrode layer within the single cell and isolate between the electrolyte layers of the neighboring single cells.

8. A bipolar battery according to claim 7,
wherein the insulation film is adhesive.

9. A bipolar battery according to claim 7,
wherein the insulation film has an opening in which the positive electrode layer or the negative electrode layer is disposed.

10. A bipolar battery according to claim 9,
wherein a cut or a notch is made in a corner or a periphery of the insulation film.

11. A vehicle, comprising;
a power source having a bipolar battery,
the bipolar battery comprising: a plurality of bipolar electrodes, each having a positive electrode layer on one side of a collecting foil and a negative electrode layer on the other side of the collecting foil; a plurality of polymer electrolyte layers, each disposed between the bipolar electrodes; and a plurality of insulation layers, each of the insulation layers being provided on an exposed portion in a periphery of at least one side of the collecting foil, being a flexible insulation film, and being protruded outward beyond the collecting foil with a protruding length longer than a thickness of one single cell, the single cell being composed of the positive electrode layer, the negative electrode layer and the electrolyte layer therebetween,
wherein the insulation layers are bent to partially overlap each other, and an insulation tape further covers the bent insulation layers, so that the insulation layers and the insulation tape isolate the positive electrode layer from the negative electrode layer within the single cell and isolate between the electrolyte layers of the neighboring single cells.

12. A vehicle according to claim 11,
wherein the insulation film is adhesive.

13. A vehicle according to claim 11, wherein the insulation film has an opening in which the positive electrode layer or the negative electrode layer is disposed.

14. A vehicle according to claim 13, wherein a cut or a notch is made in a corner or a periphery of the insulation film.

* * * * *